United States Patent
Peake et al.

(10) Patent No.: US 11,407,516 B2
(45) Date of Patent: Aug. 9, 2022

(54) CLOSED OR SEMI-CLOSED LOOP ONBOARD CERAMIC OXYGEN GENERATION SYSTEM

(71) Applicant: Carleton Life Support Systems, Inc., Davenport, IA (US)

(72) Inventors: Steven C. Peake, Dubuque, IA (US); Gary Byrd, Donahue, IA (US); Courtney J. Monzyk, Davenport, IA (US); Timothy Raleigh, Long Grove, IA (US); Chris Fellner, Blue Grass, IA (US); Gary Wu, Davenport, IA (US)

(*) Notice: Subject to any disclaimer, the term of this patent is extended or adjusted under 35 U.S.C. 154(b) by 113 days.

(21) Appl. No.: 15/949,322

(22) Filed: Apr. 10, 2018

(65) Prior Publication Data

US 2018/0290757 A1    Oct. 11, 2018

Related U.S. Application Data

(60) Provisional application No. 62/483,755, filed on Apr. 10, 2017.

(51) Int. Cl.
| | |
|---|---|
| *B64D 13/08* | (2006.01) |
| *A62B 7/14* | (2006.01) |
| *B64D 13/06* | (2006.01) |

(52) U.S. Cl.
CPC ............ *B64D 13/08* (2013.01); *A62B 7/14* (2013.01); *B64D 13/06* (2013.01);
(Continued)

(58) Field of Classification Search
CPC .. B64D 13/00; A62B 7/14; A62B 7/00; A62B 21/00; A61M 16/101; B01J 7/00; B01D 53/326; B01D 53/228
See application file for complete search history.

(56) References Cited

U.S. PATENT DOCUMENTS

| | | | |
|---|---|---|---|
| 4,622,976 A | * | 11/1986 | Timpe .................. A61B 5/0275 128/203.14 |
| 5,169,415 A | | 12/1992 | Roettger et al. |

(Continued)

FOREIGN PATENT DOCUMENTS

WO    2013180994    12/2013

OTHER PUBLICATIONS

Reynolds et al. "On board inert gas generation system/ on board oxygen generation system (OBIGGS/OBOGS) study", NASA, 2001; 210950. p. 1-58.

*Primary Examiner* — Joseph D. Boecker
*Assistant Examiner* — Thomas W Greig
(74) *Attorney, Agent, or Firm* — Woods Oviatt Gilman LLP; Katherine H. McGuire, Esq.

(57) ABSTRACT

An onboard rebreathing loop system resident on an aircraft for providing oxygen to aircraft personnel includes a ceramic oxygen generating system (COGS) module configured to receive an inlet air and output a high purity oxygen ($O_2$) gas into a breathing loop and a carbon dioxide ($CO_2$) scrubber module configured to receive exhaled air from the aircraft personnel and output a $CO_2$-scrubbed air into the breathing loop. The high purity $O_2$ gas and $CO_2$-scrubbed air are mixed to form a mixed gas having a partial pressure of $O_2$ suitable for breathing by the aircraft personnel. The onboard rebreathing loop system may further include an odor removal module, an air temperature and/or humidity control module to condition the mixed gas before breathing by the aircraft personnel, and a gas sensor module to confirm the partial pressure of $O_2$ within the mixed gas before breathing by the aircraft personnel.

5 Claims, 2 Drawing Sheets

(52) U.S. Cl.
CPC ............... *B64D 2013/0637* (2013.01); *B64D 2013/0662* (2013.01); *B64D 2013/0677* (2013.01); *B64D 2013/0681* (2013.01)

(56) References Cited

U.S. PATENT DOCUMENTS

| | | | |
|---|---|---|---|
| 5,791,982 A | 8/1998 | Curry et al. | |
| 6,033,457 A * | 3/2000 | Lawless | B01D 53/326 |
| | | | 422/121 |
| 6,093,238 A | 7/2000 | Huf | |
| 6,123,069 A * | 9/2000 | Davis | A61M 16/0808 |
| | | | 128/202.26 |
| 6,389,826 B2 | 5/2002 | Buchholz et al. | |
| 6,726,558 B1 | 4/2004 | Meirav | |
| 6,846,347 B2 | 1/2005 | Phillips et al. | |
| 6,866,701 B2 | 3/2005 | Meirav | |
| 6,988,376 B2 | 1/2006 | Brutscher et al. | |
| 7,255,104 B2 | 8/2007 | Phillips | |
| 7,396,442 B2 | 7/2008 | Bagby et al. | |
| 7,481,214 B2 | 1/2009 | Eilers | |
| 7,694,674 B2 | 4/2010 | Crome et al. | |
| 8,052,087 B2 | 11/2011 | Jorn | |
| 8,613,848 B2 | 12/2013 | Wachsman et al. | |
| 8,852,409 B2 | 10/2014 | Jankowiak et al. | |
| 9,120,571 B2 | 9/2015 | Kshirsagar et al. | |
| 9,211,954 B2 | 12/2015 | Barkowsky | |
| 9,242,734 B2 | 1/2016 | Gumm et al. | |
| 2003/0188744 A1 * | 10/2003 | Deas | A62B 7/02 |
| | | | 128/201.27 |
| 2004/0083886 A1 * | 5/2004 | Phillips | A62B 7/14 |
| | | | 95/138 |
| 2006/0062707 A1 * | 3/2006 | Crome | C01B 13/0255 |
| | | | 422/305 |
| 2006/0243859 A1 | 11/2006 | Lessi et al. | |
| 2009/0017742 A1 | 1/2009 | Diaks | |
| 2009/0227195 A1 | 9/2009 | Buelow et al. | |
| 2010/0012124 A1 | 1/2010 | Deas | |
| 2010/0242966 A1 | 9/2010 | Johnson | |
| 2012/0048273 A1 | 3/2012 | Gurr et al. | |
| 2013/0312743 A1 * | 11/2013 | Kshirsagar | A62B 7/14 |
| | | | 128/204.23 |
| 2013/0312744 A1 | 11/2013 | Kshirsagar et al. | |
| 2015/0246729 A1 | 9/2015 | Ng | |
| 2015/0343244 A1 | 12/2015 | Kshirsagar et al. | |
| 2016/0003532 A1 | 1/2016 | Young et al. | |

* cited by examiner

CLOSED OR SEMI-CLOSED LOOP ONBOARD CERAMIC OXYGEN GENERATION SYSTEM

This Application claims the benefit of U.S. Provisional Application No. 62/483,755 filed Apr. 10, 2017, which is hereby incorporated by reference in its entirety.

BACKGROUND OF THE INVENTION

Oxygen is an essential part of a pilot life support system, as supplemental oxygen is needed due to the partial pressure of oxygen in the atmosphere progressively decreasing as altitude increases. The oxygen required for pilots is typically supplied via either a stored oxygen source, such as oxygen cylinders in gaseous form or liquid oxygen stored in an onboard Dewar, or on-board generator exploiting in-situ air separation. While onboard generation reduces logistical complexity, current onboard oxygen generation systems (OBOGS) primarily rely on molecular sieves which limit oxygen purity to about 93%, with argon and a number of minor chemical compounds remaining as impurities. These OBOGS systems also require moving parts such as mechanical valves in order to separate oxygen.

Another technology which exists for producing oxygen in ground-based applications is a ceramic oxygen concentrator. A ceramic oxygen generation system (COGS) is based on oxygen ion conduction through a dense ceramic membrane driven by either electrical potential difference or oxygen partial pressure difference across the ceramic membrane, and can generate theoretically 100% pure oxygen. Indeed, this technology has advanced to the state where COGS units are used by the aviation industry and the US military to recharge cylinders with Aviator's Breathing Oxygen (ABO) grade oxygen. However, these systems remain ground-based and require loading of high pressure oxygen cylinders onto the aircraft between missions or during maintenance.

A significant challenge to using the COGS technology for on-aircraft breathing systems is that the current oxygen flow rate requirement is based on supplying the pilots' entire air supply at a breathing rate that is typically 25 liters per minute (LPM) or higher. Such flow rates prevent COGS from readily being used on aircraft due to its relatively low oxygen generation efficiency with respect to the required electrical power, weight, and size, particularly when compared to molecular sieve based OBOGS units.

While the human metabolic rate of oxygen consumption in general is quite low, current breathing systems for aircraft provide the entire air supply for the pilot. This is significantly more than the actual oxygen uptake for a typical human being, which at rest is only about 0.3 LPM, and at moderate exercise is 2 LPM. As can be seen, this oxygen uptake is much less than the 25 LPM of breathing air required for air crew.

US Application Publication No. US2013/0312743 "Onboard generation of oxygen for aircraft passengers" ("the '743 application") teaches a method using a COGS as a second onboard oxygen supplier. However, this approach did not fully address the limitations of the relatively low oxygen output for a typical ceramic oxygen generation system compared to other onboard oxygen generation systems with comparable power, size, and weight restrictions. These limitations make utilization of the method disclosed within the '743 application on aircraft impractical. Moreover, even when using a technique of pulsed oxygen delivery, which pulses oxygen into the breathing air stream during the critical inhalation period, the required oxygen flow rate to sustain a single pilot is still not practical for the current state-of-the-art COGS technology. The method still results in a COGS far exceeding the size and weight of comparable typical onboard oxygen generation systems.

Notwithstanding the above, rebreathing technology delivers only the necessary oxygen to the person breathing. Rebreathing systems have been developed which conserve the oxygen demand for underwater breathing applications. A rebreather removes the exhaled carbon dioxide from the user's breathing loop and further replaces consumed oxygen in order to control the oxygen concentration in the breathing loop. Current rebreathers use oxygen stored in the cylinders to maintain oxygen concentration and are not designed for, and have not previously been considered for, onboard aircraft breathing applications.

SUMMARY OF THE INVENTION

The present invention addresses the above needs by providing an onboard rebreathing loop system resident on an aircraft for providing oxygen to aircraft personnel. In one aspect of the present invention, the onboard rebreathing loops system includes a ceramic oxygen generating system (COGS) module configured to receive an inlet air and output a high purity oxygen ($O_2$) gas into a breathing loop and a carbon dioxide ($CO_2$) scrubber module configured to receive exhaled air from the aircraft personnel and output a $CO_2$-scrubbed air into the breathing loop. The high purity $O_2$ gas and $CO_2$-scrubbed air are mixed to form a mixed gas having a partial pressure of $O_2$ suitable for breathing by the aircraft personnel. The onboard rebreathing loop system may further include an odor removal module, an air temperature and/or humidity control module to condition the mixed gas before breathing by the aircraft personnel, and a gas sensor module to confirm the partial pressure of $O_2$ (PPO2) within the mixed gas before breathing by the aircraft personnel.

In a further aspect of the present invention, the aircraft may include a backup oxygen system (BOS) wherein the BOS provides backup $O_2$ gas to the aircraft personnel when the gas sensor module detects a partial pressure of $O_2$ within the mixed gas below a predetermined threshold. The COGS may be configured to recharge the BOS after the BOS has provided the backup $O_2$ gas and the PPO2 within the mixed gas meets or exceeds the predetermined threshold, or after the oxygen pressure in the BOS below a predetermined value and there is an excessive oxygen production capability of the COGS beyond meeting the demand from maintaining the PPO2 of the mixed air to the aircraft personnel in the breathing loop. The aircraft may also include an oxygen compressor configured to receive a portion of the high purity $O_2$ gas from the COGS and deliver a high pressure high purity $O_2$ gas to the BOS to recharge the BOS.

BRIEF DESCRIPTION OF THE DRAWINGS

The invention will further be described, by way of example, with reference to the accompanying drawings.

DETAILED DESCRIPTION

Figure 1:
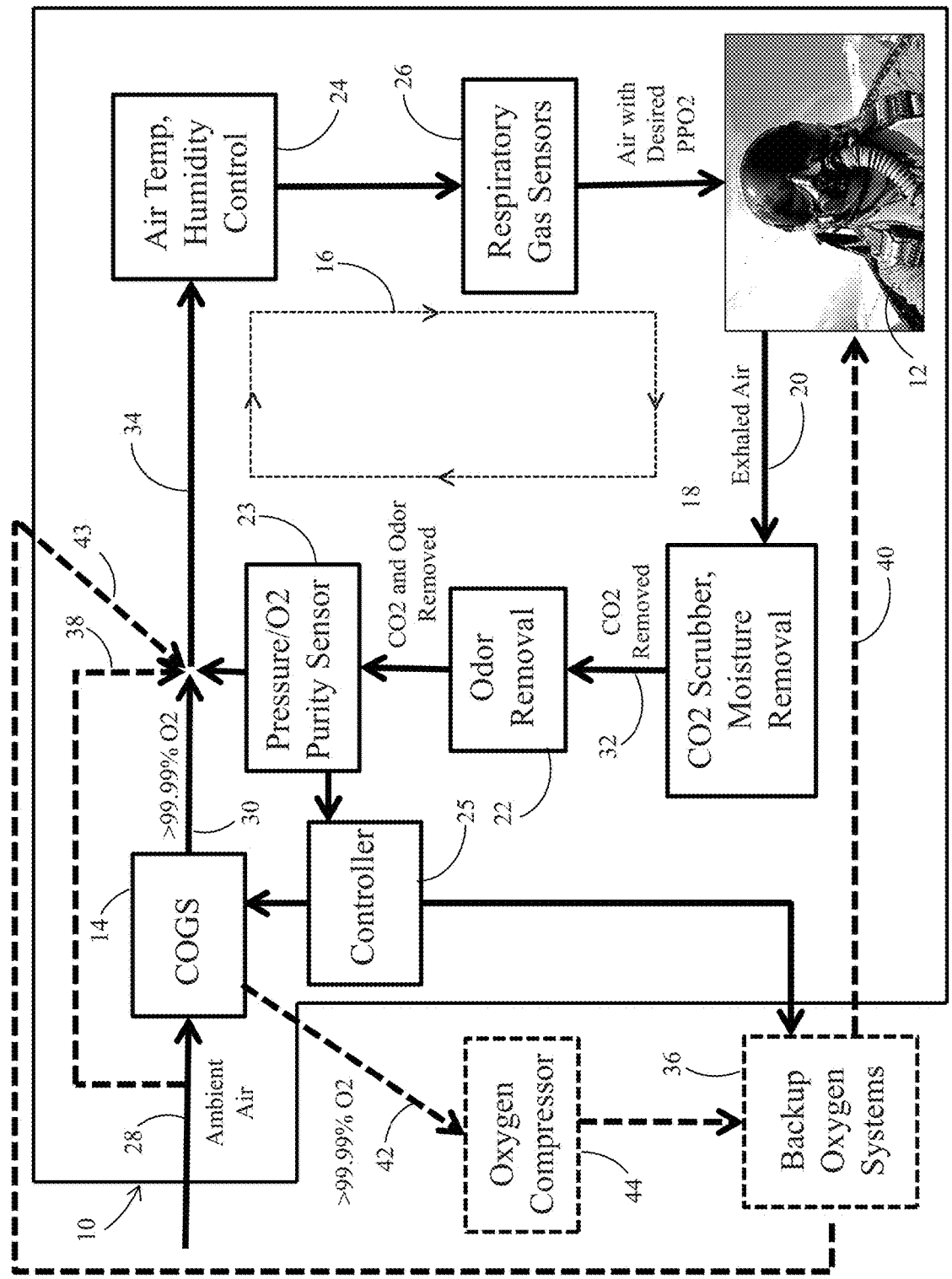
FIG. 1 is a schematic view of a closed or semi-closed loop system configured to provide oxygen to a pilot in accordance with the present invention.

With reference to FIG. 1, a closed or semi-closed loop rebreather system 10 is configured to provide high quality oxygen to pilots, crew, or other persons 12 in aircraft at altitude (collectively, "pilots"). System 10 generally comprises a Ceramic Oxygen Generating System (COGS) module 14 configured to supply replacement oxygen 30 to breathing loop 16 and a carbon dioxide ($CO_2$) scrubber module 18 configured to remove $CO_2$ from exhaled air 20 exhaled by pilot 12. System 10 may further comprise additional equipment, such as odor removal module 22 configured to remove odors from exhaled air 20, air temperature and humidity control module 24 configured to adjust air temperature and/or humidity of the air within breathing loop 16, and gas sensor module 26 configured to monitor and control oxygen ($O_2$) concentrations in breathing loop 16 so as to maintain optimum $O_2$ levels. In this manner, highly pure oxygen (>99.99% $O_2$) from COGS module 14 may provide sufficient replacement oxygen without introducing other air, such as engine bleed air or ambient air, which may contain contaminants.

By way of example, contaminants in engine bleed air making their way into current breathing gas systems is an industry-wide challenge. Significant work is being done by research groups to understand the impact of a long list of possible contaminants that come from bleed air systems which supply air under pressure to other breathing systems. This risk is present in OBOGS systems, as well as systems where high oxygen concentration air is mixed with cabin air using a dilution regulator or similar method to ensure the crew does not receive air having too high of oxygen concentration for the current altitude as this can cause oxygen toxicity.

In one aspect of the present invention, system 10 which replaces the oxygen consumed by the air crew members in order to maintain the desired level of oxygen for the cabin altitude that is being experienced by the crew member while also removing $CO_2$ from the breathing loop in sufficient quantity to ensure desired levels and ensure necessary removal to prevent hypercapnia. Additionally, being a close or semi-closed loop system may also minimize or eliminate a path for contaminants to enter the pilot or crew's breathing gas loop.

With continued reference to FIG. 1, ambient air 28, which may be cabin air or outside air, is fed into COGS module 14 whereby oxygen gas with >99.99% purity is generated. In order to ensure the partial pressure of oxygen (PPO2) in breathing loop 16 to meet the breathing needs of the pilot or crew, the PPO2 in breathing loop 16 is measured with oxygen purity and pressure sensors 23 after odor removal 22 as exhaled air 20 is moved back into breathing loop 16 such that the necessary amount of near 100% oxygen will be calculated via a controller 25, which in turn signals COGS module 14 to inject the required amount of high purity $O_2$ gas 30 into breathing loop 16 where it is mixed with $CO_2$-scrubbed air 32 which has previously been run across a $CO_2$ scrubber within $CO_2$ scrubber module 18 to remove $CO_2$ from exhaled air 20. In one aspect of the present invention, $CO_2$-scrubbed air 32 has a $CO_2$ concentration generally below 500 ppm. Mixed gas 34 may also be conditioned to a temperature and humidity appropriate for breathing via air temperature and humidity control module 24. This conditioning may require air temperature and humidity control module 24 to include heat exchangers or other components to ensure conditions are optimum or acceptable for breathing.

It should be understood by those skilled in the art that the $CO_2$ scrubbing function can be accomplished by a regenerative method or by use of a replaceable or disposable cartridge filled with a material, such as calcium carbonate or similar material. By way of example, and without limitation thereto, carbon dioxide removal may use a carbon dioxide adsorbent typically used in a dive (i.e., SCUBA) rebreather unit. In this approach, the adsorbent cartridge may be monitored and regularly replaced as needed as a part of aircraft maintenance. Additionally or alternatively, and without limitation, $CO_2$ removal may use a regenerative carbon dioxide adsorbent where the spent adsorbent is regenerated in-situ to regain the capability of $CO_2$ adsorption. An exemplary system may use two adsorbent cartridges where one cartridge is adsorbing $CO_2$ while the other cartridge is being simultaneously regenerated.

In a further aspect of the present invention, system 10 may also be used in conjunction with a bottled or liquid oxygen supply, such as Backup Oxygen System (BOS) 36. System 10 may reduce the amount of oxygen consumed from BOS 36 and thereby extend the length of time BOS 36 may provide supplemental oxygen to pilot 12. System 10 with BOS 36 may also reduce the amount of storage space required for BOS cylinders/tanks and their associated weight, both of which are significant advantages for an aircraft. A combined rebreather/BOS system 10/36 may also reduce or eliminate the potential for cabin or aircraft contamination to enter the breathing loop, such as may occur if ambient cabin air were to be directly mixed with the BOS supply. However, it should be noted that additional ambient air 38 can be introduced when high purity $O_2$ gas 30 from COGS module 14 is mixed with $CO_2$-scrubbed air 32 so as to maintain the total air flow rate when there is unintended air flow loss accompanying $CO_2$ and/or odor removal. Furthermore, coupling BOS 36 with rebreather system 10 may afford additional flexibility since backup oxygen 43 could be directly added into rebreathing loop 16 in the event that COGS module 14 is unable to provide the required amount of oxygen to maintain the PPO2 of the mixed air to the pilot in breathing loop 16, or could be provided as a 'full flow' air stream 40 where BOS 36 supplies all of the breathing gas to pilot 12.

It should be understood by those skilled in the art that rebreather system 10 is one non-limiting example of a closed or semi-closed rebreather system suitable for use onboard an aircraft. It should be further understood that additional configurations may be conceived, such as a different order of components being implemented and/or other sensors being added to measure such things as exhaled air temperature, air temperature after $CO_2$ scrubber module 18, $O_2$ concentration at different locations in breathing loop 16, including after injection of COGS $O_2$ and before and/or after $CO_2$ scrubber module 18. Additionally, odor removal module 22 may include a carbon filter or other method of odor reduction.

In a further aspect of the present invention, when oxygen demand is low, extra oxygen gas 42 produced by COGS module 14 may be used to charge/recharge the back-up oxygen cylinders of BOS 36. An electrically driven COGS module 14 is capable of self-generating oxygen to a relatively high pressure, such as 500 pounds per square inch (psi) or higher, through solid state electric ion transport as is known in the art. Pressure up to 500 psi may be sufficient for some backup systems without the need for a compressor to further pressurize $O_2$ for storage. As a result, pressurized and near 100% pure oxygen gas 42 may provide a source for recharging any gas that may have leaked or been utilized from BOS 36. Thus, when the pilot/crew demand for oxygen is below the capability of the COGS module 14, COGS module 14 may be used to recharge BOS 36. It should be noted that the valves and hardware necessary to recharge BOS 36 are not shown and may be similar to those currently used in the art. Alternatively, depending on the intended maximum pressure of the cylinders used within BOS 36, an optional oxygen compressor 44 may be used to increase the pressure of oxygen gas 42 for recharge the cylinders of BOS 36. BOS 36 may then be able to provide oxygen to pilot 12 in the event when COGS module 14 cannot provide sufficient oxygen. The COGS can be used to charge emergency oxygen cylinders in a similar manner.

Figure 2:
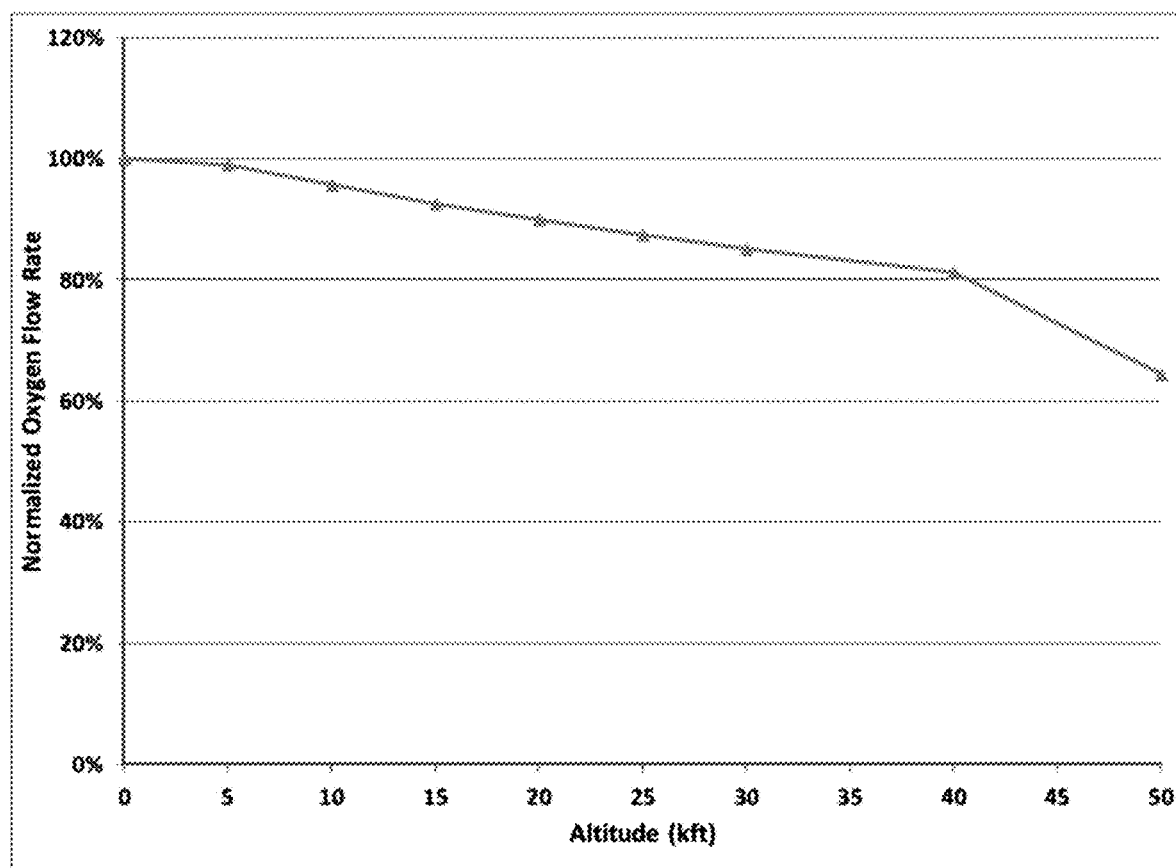
FIG. 2 is a plot showing the performance of a COGS unit suitable for use with the system shown in FIG. 1, wherein oxygen flow rate decreases as the altitude increases.

By way of example, the performance of COGS module 14 has been tested and validated at up to 50,000 feet of altitude. As shown in FIG. 2, at the identical operating conditions (voltage, temperature, and air flow rate), oxygen flow rate decreases as altitude increases. It has been found that a COGS module 14 that is capable of producing 2 LPM oxygen at the standard temperature and pressure (STP) at the seal level can generate greater than 1 LPM STP oxygen at 50,000 feet.

Although the invention has been described with reference to preferred embodiments thereof, it is understood that various modifications may be made thereto without departing from the full spirit and scope of the invention as defined by the claims which follow.

What is claimed is:

1. An onboard rebreathing loop system resident on an aircraft for providing oxygen to aircraft personnel, the system comprising:
    a) a ceramic oxygen generating system (COGS) module having a COGS inlet configured to receive an inlet air and a COGS outlet configured to output a high purity oxygen ($O_2$) gas into a breathing loop,
    b) a carbon dioxide ($CO_2$) scrubber module having a scrubber inlet configured to receive exhaled air from the aircraft personnel and a scrubber outlet configured to output a $CO_2$-scrubbed air into the breathing loop,
    c) a gas sensor module configured to receive a mixed gas of the high purity $O_2$ gas and the $CO_2$-scrubbed air and measure a partial pressure of $O_2$ within the mixed gas before breathing by the aircraft personnel,
    d) a backup oxygen system (BOS) containing high purity backup $O_2$ gas, and
    e) a controller communicatively coupled to the COGS module and the gas sensor module, wherein:
        i) the controller instructs the BOS to provide backup $O_2$ gas directly to the aircraft personnel without entering the breathing loop when the gas sensor module measures the partial pressure of $O_2$ within the mixed gas to be below a predetermined threshold; and,
        ii) the controller instructs the BOS to input backup $O_2$ gas into the breathing loop when the COGS module is unable to output a required amount of oxygen to maintain the desired partial pressure of $O_2$ within the mixed gas.

2. The onboard rebreathing loop system of claim 1 further comprising:
    e) an odor removal module configured to receive the exhaled air or the $CO_2$-scrubbed air and output a reduced-odor gas.

3. The onboard rebreathing loop system of claim 1 further comprising:
    e) an air temperature and/or humidity control module configured to receive the mixed gas and condition the mixed gas before breathing by the aircraft personnel.

4. The onboard rebreathing loop system of claim 1 wherein the COGS is configured to recharge the BOS after the oxygen pressure in the BOS is below a predetermined value and there is an excess oxygen production capability of the COGS beyond meeting the demand from maintaining the desired partial pressure of $O_2$ within the breathing loop.

5. The onboard rebreathing loop system of claim 4 wherein the aircraft includes an oxygen compressor configured to receive a portion of the high purity $O_2$ gas from the COGS and deliver a high pressure high purity $O_2$ gas to the BOS to recharge the BOS.

* * * * *